United States Patent [19]

Shumaker, Jr.

[11] 3,948,234
[45] Apr. 6, 1976

[54] METHOD AND APPARATUS FOR SUPERCHARGING

[76] Inventor: Niles A. Shumaker, Jr., P.O. Box 156, Henderson, Colo. 80640

[22] Filed: Sept. 23, 1974

[21] Appl. No.: 508,487

[52] U.S. Cl. .................. 123/119 CG; 123/119 C
[51] Int. Cl.² ............................................. F23L 17/02
[58] Field of Search .... 123/119 C, 119 CF, 119 CG

[56] References Cited
UNITED STATES PATENTS

| 1,367,623 | 2/1921 | Morgan | 123/119 CG |
| 2,114,783 | 4/1938 | Kowitt | 123/119 CG |
| 2,197,503 | 4/1940 | Martin | 123/119 CG |
| 2,254,927 | 9/1941 | Archambeau | 123/119 CG |
| 2,362,493 | 11/1944 | Lowther | 123/119 C |
| 2,825,318 | 3/1958 | Mansfield | 123/119 C |

FOREIGN PATENTS OR APPLICATIONS

| 864,479 | 7/1949 | Germany | 123/119 CG |
| 1,003,181 | 3/1952 | France | 123/119 CG |

*Primary Examiner*—Wendell E. Burns
*Assistant Examiner*—David D. Reynolds
*Attorney, Agent, or Firm*—Thomas W. O'Rourke

[57] ABSTRACT

A supercharging device and method for providing ambient temperature air at pressures above ambient to the air intake of a vehicle engine utilizing a primary air scoop through which ambient air for a radiator is drawn by an engine fan and, positioned within the throat of a venturi defined in the primary air scoop, a secondary air scoop connected to the engine air intake.

8 Claims, 4 Drawing Figures

U.S. Patent   April 6, 1976   3,948,234
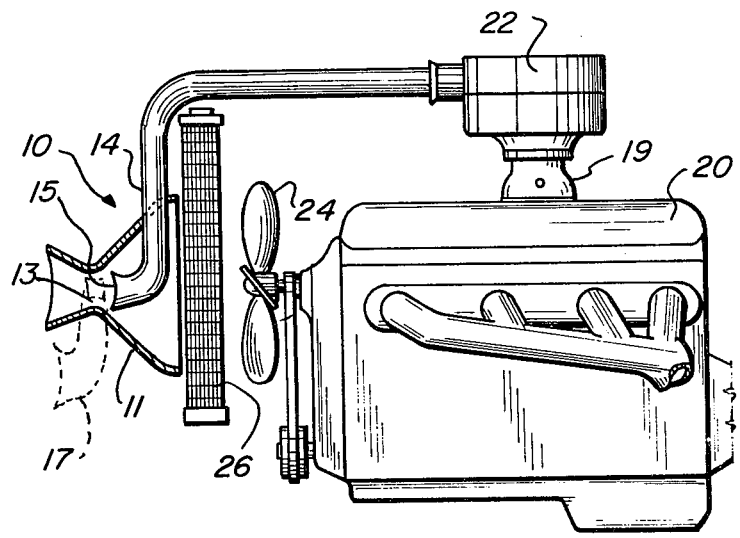
Fig_1
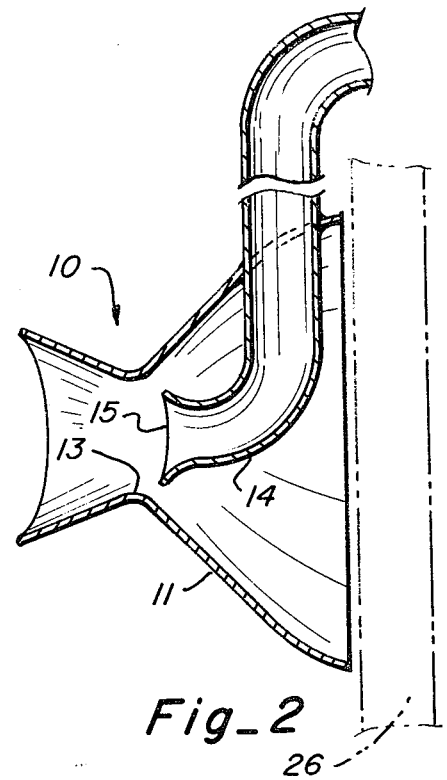
Fig_2
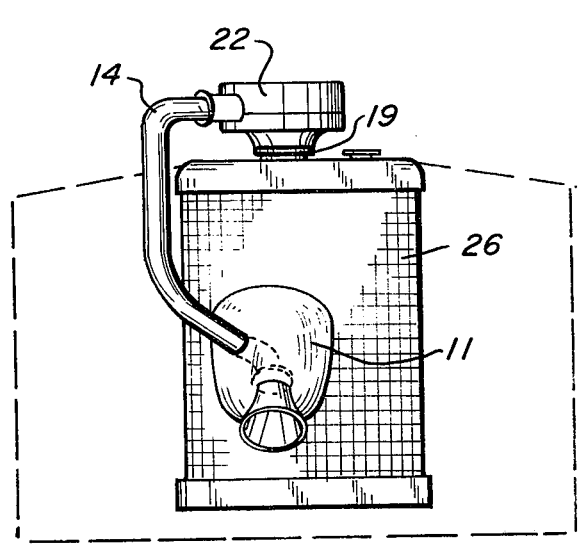
Fig_3
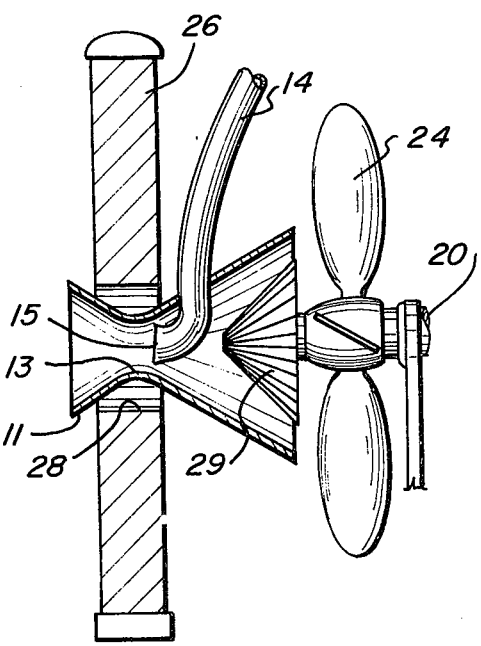
Fig_4

METHOD AND APPARATUS FOR SUPERCHARGING

BACKGROUND OF THE INVENTION

1. Field of the Invention

The present invention relates generally to supercharging of vehicle engines and more particularly to supercharging vehicle engines using the cooling fan to provide ambient temperature air for the supercharging effect.

2. Description of the Prior Art

The performance of an internal combustion engine is largely a function of the volumetric efficiency of the engine. Incoming fuel charges to such engines are, in normally aspirated engines, inducted by a pressure differential between the ambient atmospheric pressure and the pressure within the engine. By increasing the external pressure through supercharging, volumetric efficiencies can be substantially improved.

While expensive routes and centrifugal superchargers driven by belts or exhaust gases are well known, there are only two types of relatively inexpensive supercharges. These utilize either the engine cooling fan for pressure boost or, alternatively, the ram effect of the vehicle motion to provide a supercharging effect.

Examples of prior art devices using the cooling fan of an engine to provide a supercharger effect may be found in U.S. letters Patent Nos. 2,114,783, 2,175,106 and 2,254,927. In each of these prior art examples, the air for supercharging is collected after it passes the cooling fan and, accordingly, after it is drawn through the radiator. As a result, such air is heated above ambient temperature and is at a density less than that of the ambient atmosphere. As is well known, heated air, being of a diminished density, detracts from the volumetric efficiency of an engine. Thus, while the prior art examples using the cooling fan to provide air at elevated temperatures may provide a net increase in horse power, the potential increase is not realized as a result of the use of air heated by the cooling radiator of the engine.

Air at ambient temperature is provided by the ram effect type of superchargers such as that described in U.S. letters Patent No. 2,852,012. However, while air at ambient temperature is provided by this arrangement, the pressure increase is moderate and entirely a function of the vehicle speed. Accordingly, at lower speeds and in lower ratio gears, the ram effect is greatly diminished. This is to be contrasted to the increased supercharger effect in the higher power ranges of most internal combustion engines when in lower gears and utilizing the cooling fan for pressure increase.

Summarily, the prior art low-cost supercharging mechanisms either utilize heated air for the supercharging effect, or, alternatively, are entirely dependent upon the vehicle speed and of marginal effectiveness in the lower gear ratios even though the engine may be operating at high rpm's and within the optimum power range.

SUMMARY OF THE INVENTION

The present invention, which provides a heretofore unavailable improvement over other simple low-cost supercharging devices, comprises a method and device for providing air at ambient temperatures and pressures elevated relative to ambient pressure by means of the cooling fan of an engine. The device makes use of a primary air scoop having a venturi or necked area through which air is drawn by the vehicle cooling fan and passed through the radiator, either while in the scoop or after exiting from the scoop. A secondary scoop is positioned within or adjacent to the venturi area and connected to the carburetor input.

Accordingly, an object of the present invention is to provide a new and improved method and device for providing supercharging to vehicle engines in a simple, inexpensive manner.

Another object of the present invention is to provide a new and improved method and device for utilizing the vehicle cooling fan to provide air at elevated pressures to an engine air inlet.

Yet another object of the present invention is to provide a new and improved method and device for providing ambient temperature air to a vehicle engine air inlet without primary reliance upon the ram effect of the vehicle.

These and other objects and features of the present invention will become apparent from the following description.

BRIEF DESCRIPTION OF THE DRAWINGS

In the drawings:

FIG. 1 is a partially-sectioned illustration of a vehicle engine utilizng the supercharging device of the instant invention;

FIG. 2 is a sectioned side view of the embodiment of FIG. 1 showing in more detail the novel aspects of the instant invention;

FIG. 3 is a front view of the device of the instant invention; and

FIG. 4 is a sectioned side view of an alternative embodiment of a device in accordance with the instant invention.

DETAILED DESCRIPTION OF THE INVENTION

Turning now to the drawings, wherein like components are designated by like reference numerals throughout the various figures, a device for providing supercharging air to a vehicle is illustrated in FIGS. 1 and 3 and generally designated by the reference numeral 10.

As shown in FIG. 2, supercharging device 10 is comprised of primary intake scoop 11 in communication with the atmosphere at one end and having a venturi 13 defined therein, secondary intake scoop 14 positioned with secondary intake opening 15 within or adjacent to the throat of venturi 13. Primary intake scoop 11 is illustrated as being symmetrically formed but, for accommodating various vehicles, it is to be understood that various configurations such as that shown in ghosted manner of alternative primary intake 17 are also feasible.

With reference to FIGS. 1 and 3, secondary intake scoop 14 is in communication with the engine air intake, such as carburetor 19 of a vehicle engine 20, preferably through an intermedite air cleaner 22. Preferably, the float chamber of carburetor 19 is vented to the air cleaner 22 in order to maintain a common reference pressure across the venturi of carburetor 19.

In operation, cooling fan 24 is rotated by engine 20 in a conventional manner and draws air through radiator 26, as shown in FIGS. 1 and 3. Primary intake scoop 11, being located adjacent the intake side of radiator 26, has air drawn therethrough by cooling fan 24. The air drawn into primary intake scoop 11 by cooling fan 24 is at a relatively high velocity at venturi 13. This high velocity air, which is at atmospheric temperature except for a minor pressure change effect, impinges upon the opening 15 of secondary intake scoop 14 and is conducted to carburetor 19 at an elevated pressure as a result of such high velocity impingement. Not all of the air induced into primary intake scoop 11 by cooling fan 24 is conducted to carburetor 19, but rather substantial portions flow through primary intake scoop 11 and through radiator 26 to produce the desired cooling effect at radiator 26. Further, as is shown more specifically in FIG. 3, only a relatively small portion of the radiator surface need be covered by primary intake scoop 11 so that any reduced efficiency of cooling radiator 26 is minimized. However, a modest enlargement of raditor 26 may be required for extreme conditions.

An alternative embodiment of the present invention is shown in FIG. 4 in which primary intake scoop 11 is positioned through an opening 28 in radiator 26, opening 28 in radiator 26 preferably being at venturi 13 to minimize the size of the radiator opening 28. It is to be understood that primary intake scoop 11 can be formed in two pieces in order that the size of opening 28 in radiator 26 be minimized. By positioning primary intake scoop 11 in radiator opening 28, a more effective flow through primary intake scoop 11 can be accomplished. To further maximize the flow through primary intake scoop 11, a conical member 29 may be affixed to cooling fan 24 to minimize turbulence and to direct the air flow into the most effective portion of cooling fan 24.

Summarily, the use of primary intake scoop 11 in conjunction with secondary intake scoop 14 permits cooling fan 24 to draw air through primary intake scoop 11 and, at venturi 13 of primary intake scoop 11, impinge the relatively high velocity but substantially atmospheric temperature air into opening 15 of secondary intake scoop 14. This provides air at substantially ambient temperature but at elevated pressures to carburetor 19. Since cooling fan 24 is the primary means of drawing air into primary intake scoop 11, though a ram effect may come into place at higher speeds, a supercharging of engine 20 may be accomplished even at relatively low vehicle speeds when engine 20 is operating at relatively high revolutions as would be the case when maximum power is desired. Accordingly, the most desirable effects of the prior art fan-induced supercharging, i.e., low speed effectiveness, as well as the advantages of ram supercharging, i.e., ambient air temperatures, are simultaneously, accomplished according to the teachings of the instant invention.

Although only two embodiments of the present invention have been illustrated and described, it is anticipated that various changes and modifications will be apparent to those skilled in the art, and that such changes may be made without departing from the scope of the invention, as defined by the following claims.

What is claimed is:

1. A method for providing a pressure boost of substantially ambient temperature air to the combustion air intake of an internal combustion engine, comprising: inducing ambient temperature air to flow into a primary intake scoop opening by means of an engine cooling fan; accelerating the air in the primary intake scoop by passing the air through a venturi defined in the primary intake scoop; generating a pressure boost in a secondary intake scoop opening located within the venturi by impinging air accelerated by the venturi into the opening of the secondary intake scoop; conducting the air in the secondary intake scoop to the engine combustion air intake; and conducting substantially the remainder of the air induced into the primary intake scoop and not conducted to the engine combustion air intake to the exit of the primary intake scoop, whereby a portion of ambient temperature air induced into the primary intake scoop is provided at an elevated pressure to the combustion air intake of the engine to provide a supercharging effect and the remainder of the air induced in the primary intake scoop is conducted to the engine cooling means.

2. A method as set forth in claim 1 in which the air is inducted into the primary intake scoop and exhausted from the primary intake scoop on the intake side of a cooling radiator.

3. A method as set forth in claim 1 in which the air is induced into the primary intake scoop on the intake side of a cooling radiator and exhausted from the primary intake scoop on the exhaust side of the cooling radiator as a result of the primary intake scoop extending through an opening defined in the radiator.

4. A method as set forth in claim 3 in which the air is exhausted from the primary intake scoop adjacent the engine cooling fan.

5. In an internal combustion engine having a combustion air intake, a cooling fan and a radiator, the improvement comprising: a primary intake scoop having an intake opening positioned on the air intake side of the radiator and aligned with the cooling fan, the primary intake scoop further having a venturi section defind therein; a secondary intake scoop having an intake opening aligned with the exit of the venturi section and positioned within but spaced from the walls of the primary intake scoop, the secondary intake scoop being connected to the engine combustion air intake, whereby the cooling fan induces air to flow into the primary intake scoop, the venturi accelerates the air to a higher velocity, the secondary intake scoop contains the air at an elevated pressure and substantially ambient temperature as a result of impingement of the accelerated air on the opening thereof, and the engine undergoes a supercharging effect as a result of the air and elevated pressure being conducted to the combustion air inlet of the engine.

6. Apparatus as set forth in claim 5 in which the primary intake scoop exhaust opening is located adjacent the cooling radiator on the intake side thereof.

7. Apparatus as set forth in claim 5 in which the primary intake scoop passes through an opening defined in the radiator and the exhaust opening thereof is positioned adjacent the cooling fan.

8. Apparatus as set forth in claim 7 in which the cooling fan includes a concentric member attached thereto and extending into the exhaust opening of the primary intake scoop to enhance air flow through the primary intake scoop.

* * * * *